United States Patent
Bitsis, Jr.

(10) Patent No.: US 10,781,737 B1
(45) Date of Patent: Sep. 22, 2020

(54) REGENERATION OF AUTOMOTIVE EXHAUST AFTERTREATMENT DEVICE USING DIVERTED BOOST AIR DURING DECELERATION

(71) Applicant: Southwest Research Institute, San Antonio, TX (US)

(72) Inventor: Daniel C. Bitsis, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/352,928

(22) Filed: Mar. 14, 2019

(51) Int. Cl.
| | |
|---|---|
| *F01N 3/00* | (2006.01) |
| *F01N 9/00* | (2006.01) |
| *F01N 3/029* | (2006.01) |
| *F01N 11/00* | (2006.01) |
| *F02M 31/20* | (2006.01) |

(52) U.S. Cl.
CPC ............ *F01N 9/002* (2013.01); *F01N 3/029* (2013.01); *F01N 11/00* (2013.01); *F02M 31/20* (2013.01); *F01N 2270/00* (2013.01); *F01N 2560/06* (2013.01); *F01N 2610/14* (2013.01); *F01N 2900/08* (2013.01); *F01N 2900/1602* (2013.01)

(58) Field of Classification Search
CPC .......... F01N 9/002; F01N 3/029; F01N 11/00; F02M 31/20
USPC ......................................................... 60/274
See application file for complete search history.

(56) References Cited

U.S. PATENT DOCUMENTS

| | | | |
|---|---|---|---|
| 5,081,836 A | 1/1992 | Smith et al. | |
| 6,276,139 B1* | 8/2001 | Moraal | F01N 3/023 60/605.2 |
| 6,722,128 B1 | 4/2004 | Adrian | |
| 8,359,840 B2 | 1/2013 | Nieuwstadt et al. | |
| 2004/0020194 A1* | 2/2004 | Nishimura | F02D 41/029 60/297 |
| 2011/0072803 A1* | 3/2011 | Van Nieuwstadt | F01N 3/30 60/287 |
| 2013/0340424 A1* | 12/2013 | Van Nieuwstadt | F01N 9/002 60/600 |
| 2014/0109553 A1* | 4/2014 | Roberts, Jr. | F01N 9/00 60/274 |
| 2015/0053190 A1* | 2/2015 | Hubbard | F01N 3/035 123/679 |

FOREIGN PATENT DOCUMENTS

| | | | | |
|---|---|---|---|---|
| EP | 1491735 A1 * | 12/2004 | ............ | F02B 37/164 |
| FR | 2931514 | 11/2009 | | |

\* cited by examiner

*Primary Examiner* — Jason D Shanske
(74) *Attorney, Agent, or Firm* — Livingston Law Firm

(57) ABSTRACT

A method, used with an internal combustion engine, of providing fresh air for regeneration of an exhaust aftertreatment device. An air intake diversion line is installed from a point between the throttle and the compressor to a point upstream of the exhaust aftertreatment device. A valve on this diversion line is normally closed. If the engine temperature is above a certain threshold and if the engine is in a "high load deceleration" state, the valve is opened, which diverts fresh air to the exhaust aftertreatment device. The valve is then closed after the pressure in the intake line is relieved.

6 Claims, 3 Drawing Sheets

REGENERATION OF AUTOMOTIVE EXHAUST AFTERTREATMENT DEVICE USING DIVERTED BOOST AIR DURING DECELERATION

TECHNICAL FIELD OF THE INVENTION

This invention relates to internal combustion engines, and more particularly to regeneration of exhaust aftertreatment devices.

BACKGROUND OF THE INVENTION

Exhaust aftertreatment devices such as particulate filters are known in the art for controlling vehicle engine emissions. During engine operation, carbon particulates are produced as byproducts of combustion. These materials are subsequently collected by the particulate filter. As the carbon particulates accumulate within the filter, the filter must be regenerated.

Regeneration is the process of removing accumulated soot or other emissions material from the exhaust aftertreatment device. Passive regeneration uses the engine's exhaust heat, sometimes aided by adding a catalyst aftertreatment device. Active regeneration introduces very high heat into the exhaust system.

On-board active regeneration can use a variety of strategies, mostly directed at increasing temperature of the exhaust or of the aftertreatment device itself. Examples are engine management to increase exhaust temperature through late fuel injection or injection during the exhaust stroke, use of catalysts, fuel burners downstream the turbocharger, and heating coils or microwave energy.

Most regeneration techniques also require additional oxygen to be available. For example, in the case of a particulate filter, oxygen assists in oxidation of soot. Various techniques have been developed to overcome lack of sufficient oxygen during regeneration.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to regeneration of exhaust aftertreatment devices, such as a particulate filter, used in an internal combustion engine. This method is useful for throttled engines, gasoline or diesel, that also have a turbocharger or supercharger. The method redirects fresh air to the aftertreatment device that would otherwise be recirculated. This fresh air assists in regeneration of the aftertreatment device.

In turbocharged or supercharged engines that operate with an intake throttle, the throttle is used to help maintain a desired air-fuel ratio. Superchargers and turbochargers are referred to herein collectively as "air boosting devices".

For purpose of example herein, the exhaust aftertreatment device to be regenerated is a particulate filter. However, the method of the invention may be used with any other type of exhaust aftertreatment device that benefits from fresh air during regeneration. Other possible aftertreatment devices may be NOx traps or three-way catalysts.

In many engine applications, especially those that operate at stoichiometric conditions, the required intake manifold pressure may vary from above ambient at full load to below ambient at light load. In these applications, careful consideration is given to the air boosting device during a hard "tip out" or "hard deceleration". During a hard deceleration, the intake throttle is closed and there is excess pressure in the air intake line between the compressor and throttle. If not relieved, this pressure will cause compressor surge, which is a condition where the pressure ratio is high while the flow is low. This is not only audible but can damage the compressor and abruptly slow it down.

Figure 1:
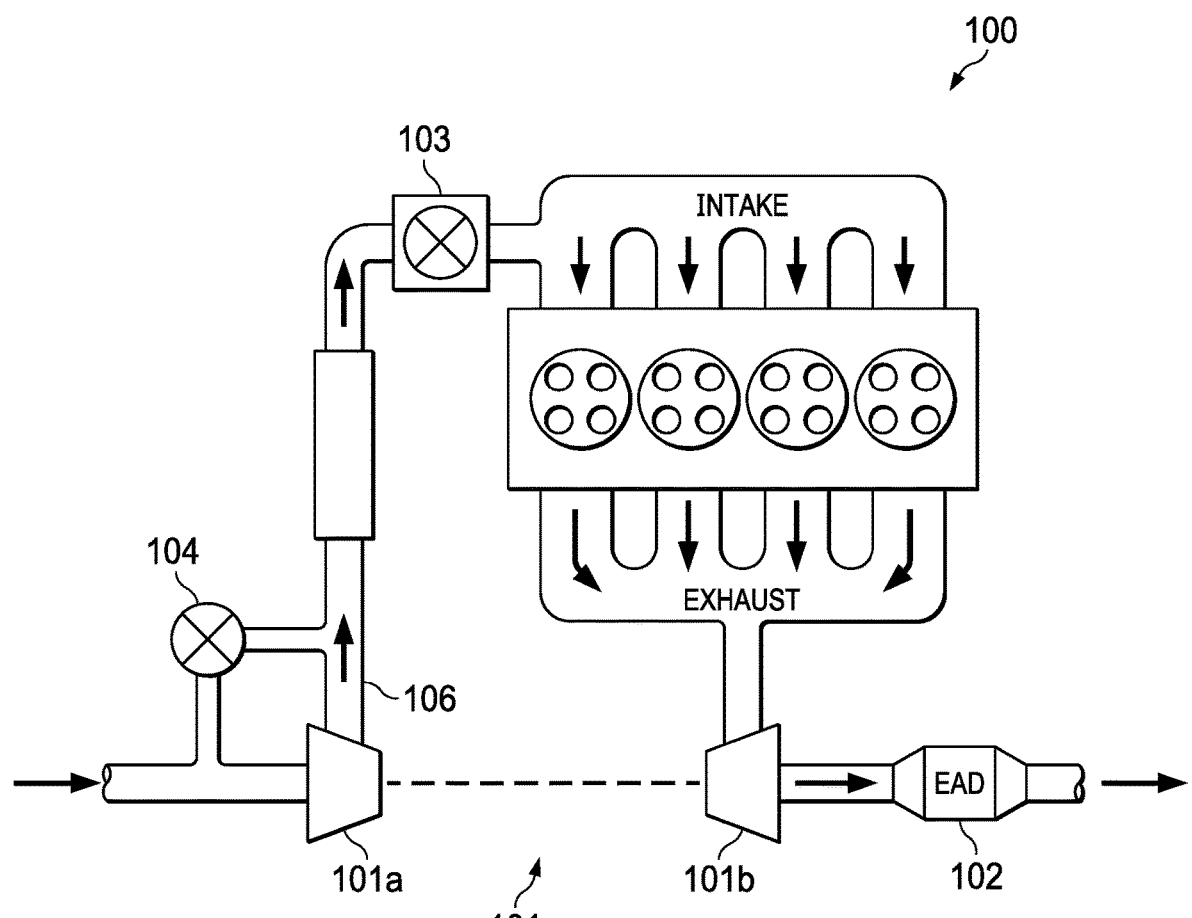
FIG. 1 illustrates an engine having a conventional high-pressure relief recirculation line.

FIG. 1 illustrates a conventional internal combustion engine 100 of the type for which the invention is useful. Only those elements of engine 100 relevant to the invention are specially described herein, and it is to be assumed that engine 100 has all the parts of a typical engine.

A turbocharger 101 has a compressor 101a and turbine 102b. An exhaust aftertreatment device 102, such as a particulate filter, is installed downstream the turbine 101b on the engine's main exhaust line.

Engine 100 uses a throttle 103 to maintain a desired air-fuel ratio. As stated in the Background, during certain engine operating conditions, excess air pressure can arise in the intake line 106 between the throttle 103 and compressor 101a.

In a conventional engine, a bypass valve 104 is used to relieve excess air pressure in the fresh air intake line. When the valve 104 is open, excess air pressure is recirculated back to the inlet of the compressor 101a.

Figure 2:
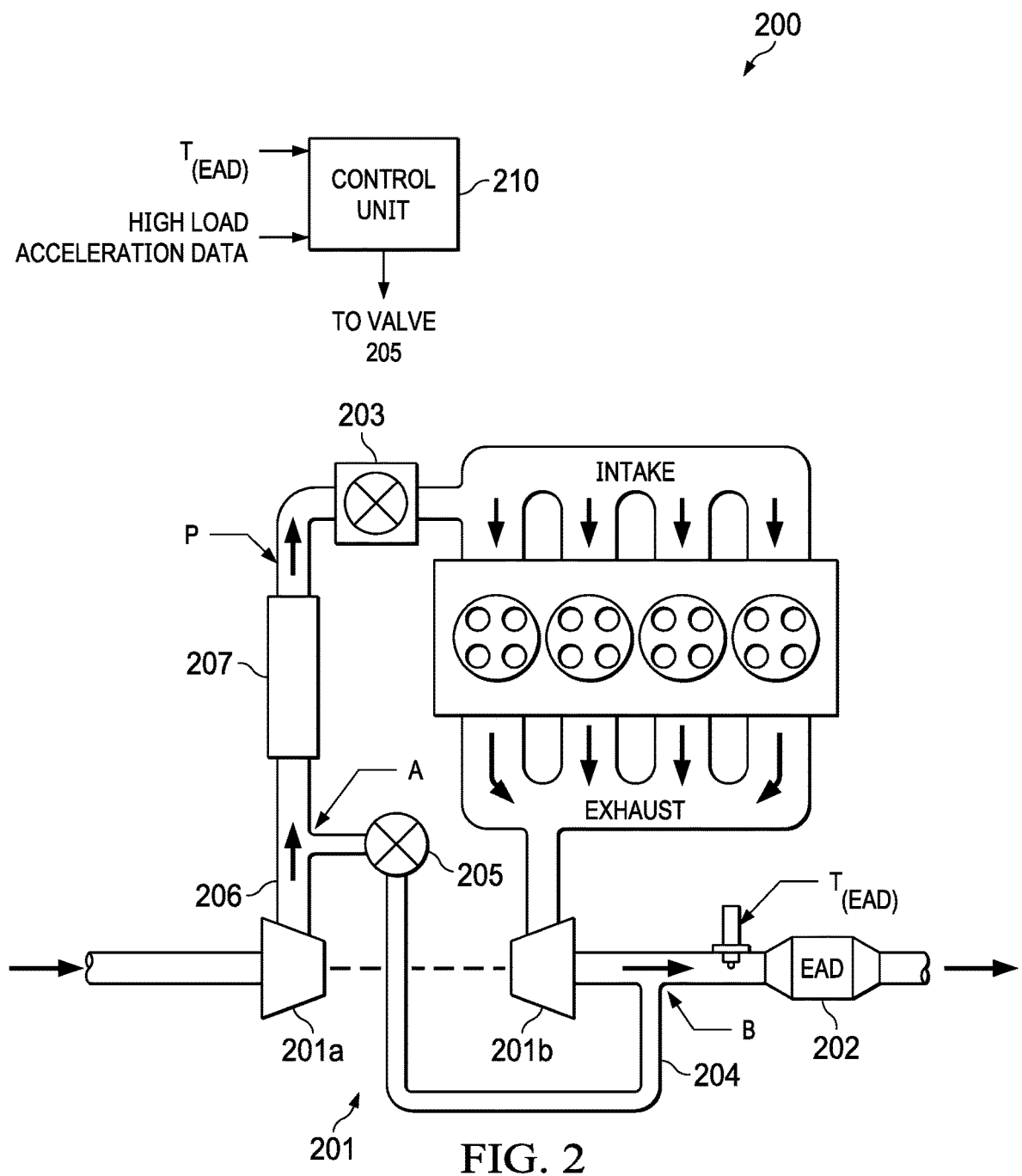
FIG. 2 illustrates an engine having an intake diversion line to an exhaust aftertreatment device in accordance with the invention.

FIG. 2 illustrates an engine 200 having a fresh air diversion valve 205 in accordance with the invention. Like engine 100, engine 200 has a turbocharger 201, with a compressor 201a and turbine 202b. It should be noted that the invention is also useful when the compressor is part of a supercharger rather than a turbocharger.

An exhaust aftertreatment device 202, such as a particulate filter, is installed downstream the turbine 201b on the main exhaust line.

A throttle 203 is used to maintain a desired air-fuel ratio. As with engine 100, during certain engine operating conditions, engine 200 can experience excess air pressure in the fresh air intake line 206 between the throttle 203 and compressor 201a.

In the case of engine 200, a diversion line 204 is installed between points A and B illustrated in FIG. 2. Point A is between throttle 203 and compressor 201a. If engine 200 has a charge air cooler 207, Point A is downstream cooler 207. Point B is between turbine 201b and aftertreatment device 202. Typically, Point B will be immediately upstream the aftertreatment device 202.

A valve 205 controls whether air from the compressor intake line 206 shall be diverted through diversion line 204. Various implementations of valve 205 are possible; valve 205 can be air-actuated or electrically actuated. Valve 205 can be an on/off valve or can be variable.

Valve 205 is normally closed. However, as explained below in connection with FIG. 3, when valve 205 is open, diversion line 204 provides relief for the compressor 201a.

At the same time, the opening of valve 205 adds oxygen to the exhaust upstream of aftertreatment device 202.

Engine 200 is further equipped with a control unit 210, which allows the use of diversion line 204 and valve 205 to be incorporated into the engine's control strategy. Control unit 210 is assumed to have appropriate hardware and software, programmed in accordance with the method described herein.

As explained below in connection with FIG. 3, control unit 210 receives data representing the temperature of the exhaust aftertreatment device, T(EAD). It also receives data representing whether the engine is in a "high load deceleration condition" as defined herein. Control unit 210 stores threshold temperature data, which it compares to the current temperature values. Control unit 210 then processes all input data to determine whether to generate a signal to actuate valve 205.

Figure 3:
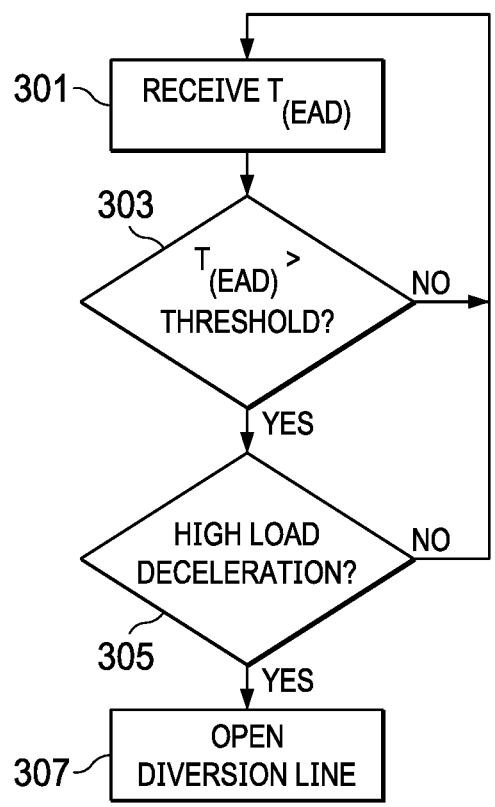
FIG. 3 illustrates a method of using the intake diversion line of FIG. 2.

FIG. 3 illustrates one method of using diversion line 204. Step 301 is receiving the temperature of the exhaust aftertreatment device, T(EAD). Referring again to FIG. 2, this temperature data can be acquired using a sensor at the intake of aftertreatment device 202. Alternatively, temperature could be implied from data representing the engine load history.

Step 303 is determining whether T(EAD) is above a stored threshold temperature. As stated above, if engine 200 has been above a certain load for a certain time period, T(EAD) will be sufficiently high for the oxidation requirements of regeneration. If so, the method proceeds to Step 305.

Step 305 determines whether there has been a "deceleration" (also referred to as a tip-out). This occurs after high load operation, when the vehicle operator suddenly decelerates or reduces the engine load such that the intake throttle 203 closes. Referring again to FIG. 2, a "high load deceleration" can be determined or implied by a sensor that measures intake manifold pressure (P) or any pressure in intake line 206 between throttle 203 and compressor 201a. If the current pressure target is above ambient and the next pressure target is below ambient, then throttle 203 closes, and a high load deceleration condition is assumed to exist.

In Step 307, if T(EAD) is above the desired threshold and if there is a high load deceleration, control unit 210 opens valve 205. As a result, a burst of fresh air is sent to the exhaust aftertreatment device 202. Where aftertreatment device 202 is a particulate filter, this burst of fresh air aids in soot oxidation.

The opening of valve 205 is further timed to occur during regeneration of the exhaust aftertreatment device. The valve opening may coincide with the beginning of regeneration or it may occur at some other time during regeneration. This timing will vary, depending on the regeneration requirements, such as a need for increased oxygen in the exhaust entering the aftertreatment device.

The duration of the opening of valve 205 may vary depending on regeneration requirements of the exhaust aftertreatment device but is no longer than required to relieve the high intake pressure. Then, valve 205 is closed.

It is not expected that the method of FIG. 3 would be the sole method for regenerating an aftertreatment device, but it could be an integral part of the overall strategy.

What is claimed is:

1. A method, used with an internal combustion engine having an air intake system with a throttle, an air intake line, and a compressor, and the engine having at least one exhaust aftertreatment device on a main exhaust line, of providing fresh air for regeneration of the exhaust aftertreatment device, comprising:

installing a diversion line from a point between the throttle and the compressor to a point upstream of the exhaust aftertreatment device;

wherein the diversion line is operable to carry air from the air intake line to the main exhaust line;

receiving temperature data representing the temperature of the exhaust aftertreatment device;

comparing the temperature data to a threshold temperature value;

receiving deceleration data indicating whether the engine is in a deceleration tip-out condition;

opening a valve on the diversion line in response to the temperature data and the deceleration data, such that the diversion line provides air flow to the exhaust aftertreatment device in response to the tip-out condition and operates to decrease pressure in the air intake line;

wherein opening the valve occurs at a time when regeneration of the exhaust aftertreatment device is occurring or will immediately occur; and, closing the valve after pressure in the intake line falls to a desired pressure.

2. The method of claim 1, wherein the compressor is part of a turbocharger.

3. The method of claim 1, wherein the compressor is part of a supercharger.

4. The method of claim 1, wherein the step of receiving temperature data is performed by receiving data from a temperature sensor at the intake of the exhaust aftertreatment device.

5. The method of claim 1, wherein the exhaust aftertreatment device is a particulate filter.

6. The method of claim 1, wherein the step of receiving deceleration data is performed by receiving data from a sensor that measures intake manifold pressure.

* * * * *